US011587233B2

(12) United States Patent
Huang et al.

(10) Patent No.: US 11,587,233 B2
(45) Date of Patent: Feb. 21, 2023

(54) DISPLAY PANEL DEFECT ENHANCEMENT

(71) Applicant: International Business Machines Corporation, Armonk, NY (US)

(72) Inventors: JingChang Huang, Shanghai (CN); Sheng Nan Zhu, Shanghai (CN); Fan Li, Shanghai (CN); Peng Ji, Nanjing (CN); Jian Xu, Shanghai (CN); Wei Zhao, Shanghai (CN); Jinfeng Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 16/655,459

(22) Filed: Oct. 17, 2019

(65) Prior Publication Data

US 2021/0118141 A1    Apr. 22, 2021

(51) Int. Cl.
G02F 1/13 (2006.01)
G06T 7/11 (2017.01)
H04N 13/122 (2018.01)
G02B 27/01 (2006.01)
G09G 3/20 (2006.01)
G09G 3/36 (2006.01)
G06V 40/30 (2022.01)

(52) U.S. Cl.
CPC ............ G06T 7/11 (2017.01); G02B 27/017 (2013.01); G02F 1/1309 (2013.01); G06V 40/33 (2022.01); G09G 3/2003 (2013.01); G09G 3/3607 (2013.01); H04N 13/122 (2018.05)

(58) Field of Classification Search
CPC ...... G06T 7/11; H04N 13/122; G02B 27/017; G02F 1/1309; G09G 3/2003; G09G 3/3607; G06K 9/00161
See application file for complete search history.

(56) References Cited

U.S. PATENT DOCUMENTS

| 8,743,215 B1* | 6/2014 | Lee ................ G09G 3/20 348/189 |
| 10,192,301 B1* | 1/2019 | Panda ............. G06T 7/11 |
| 2003/0059101 A1* | 3/2003 | Safaee-Rad ........ G06T 7/001 382/141 |
| 2015/0062203 A1 | 3/2015 | Sun et al. |
| 2016/0260368 A1 | 9/2016 | Zheng |
| 2016/0282624 A1 | 9/2016 | Munger et al. |

FOREIGN PATENT DOCUMENTS

CN         108846841 A      11/2018

OTHER PUBLICATIONS

Well et al., "The NIST Definition of Cloud Computing", Recommendations of the National Institute of Standards and Technology, NIST Special Publication 800-145, Sep. 2011, 7 pages.

* cited by examiner

*Primary Examiner* — Sanghyuk Park
(74) *Attorney, Agent, or Firm* — Brian M. Restauro (57) ABSTRACT

The present invention relates to a method, system and computer program product for defect enhancement. According to the method, a plurality of proposed regions from a plurality of images taken for a display panel is obtained. Each of proposed region of the plurality of proposed regions include a suspected defect on the display panel. At least two proposed regions from the plurality of proposed regions that deserve to be superimposed based on a set of conditions is determined. The at least two proposed regions for acquiring an enhanced defect are superimposed.

14 Claims, 6 Drawing Sheets

DISPLAY PANEL DEFECT ENHANCEMENT

BACKGROUND

The present invention generally relates to image processing, and more specifically, relates to methods, systems or computer program products for defect enhancement of a display panel.

With wide demand of various electronic display panels in a number of electronic devices, panel quality assurance is an important issue in mass production. In manufacturing, quality control is a process that ensures customers receive products free from defects and meet their needs. Effective quality control typically monitors products at the end of production as well as reviewing the product's design.

SUMMARY

According to an aspect of the present invention, there is a method, computer program product and/or system that performs the following operations (not necessarily in the following order): obtaining a plurality of proposed regions from a plurality of images taken for a display panel, wherein each proposed region in the plurality of proposed regions includes a suspected defect on the display panel, and determining at least two proposed regions from the plurality of proposed regions that deserve to be superimposed based on a set of conditions, and superimposing the at least two proposed regions for acquiring an enhanced defect.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Currently, human visual inspection is the most commonly used method for panel surface defect detection. However, manual inspection is slow, subjective, costly and highly dependent on an operator's experience. To promote product quality of electronic display panel in mass manufacturing of electronic products, development of an automatic defect inspection system to replace human inspection is required. Machine vision has started to be used in automated inspection. But there is still a need to improve the accuracy and reduce likelihood of miss-inspection.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
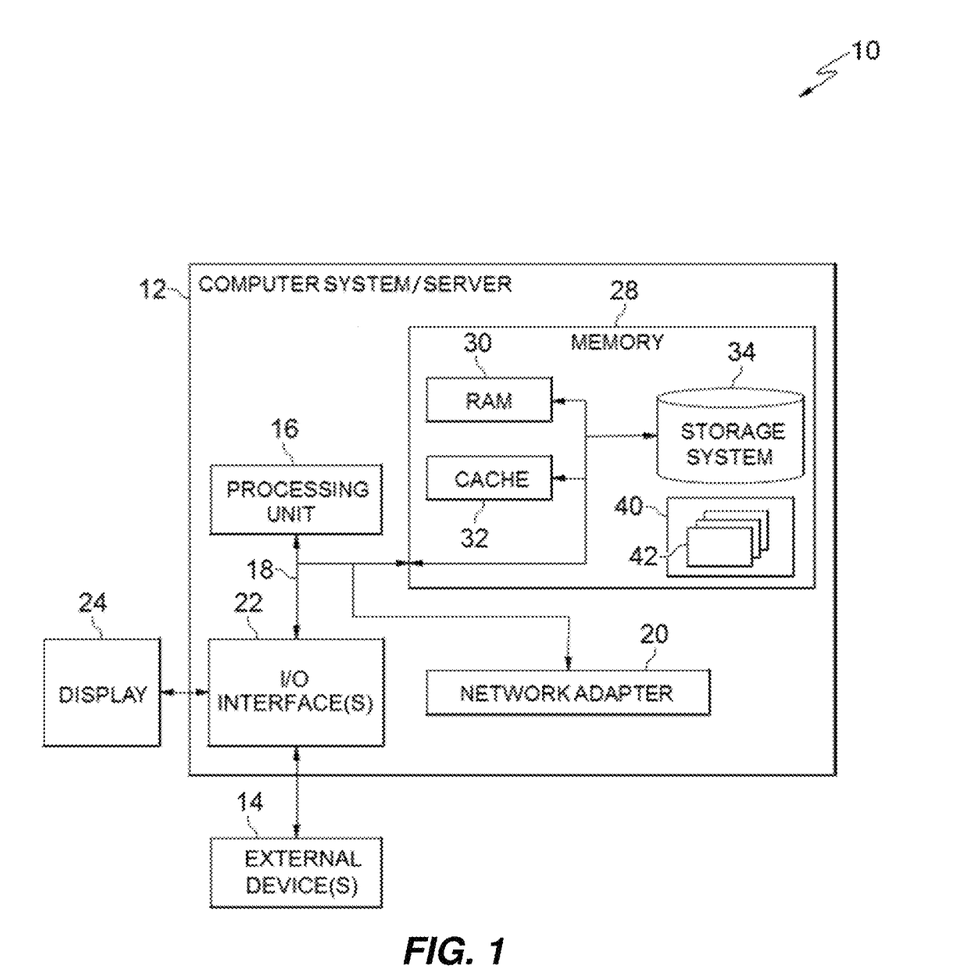
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
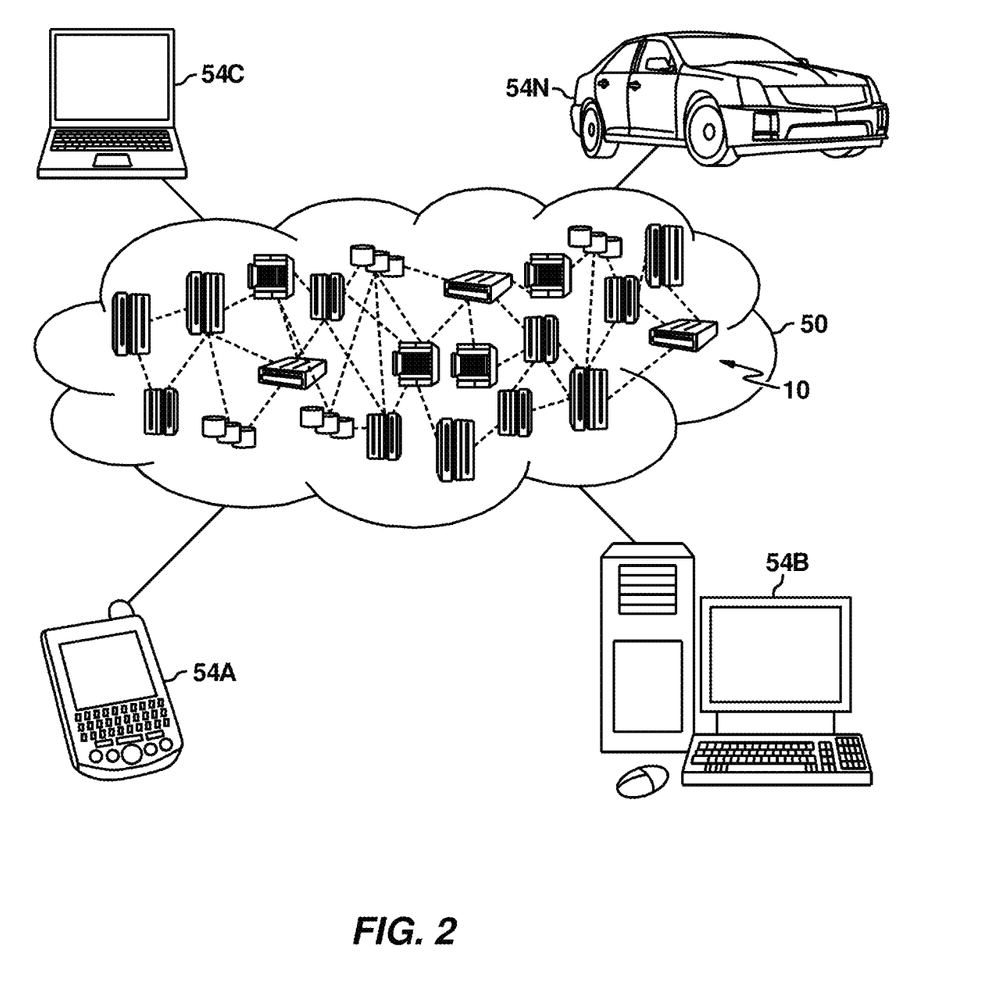
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
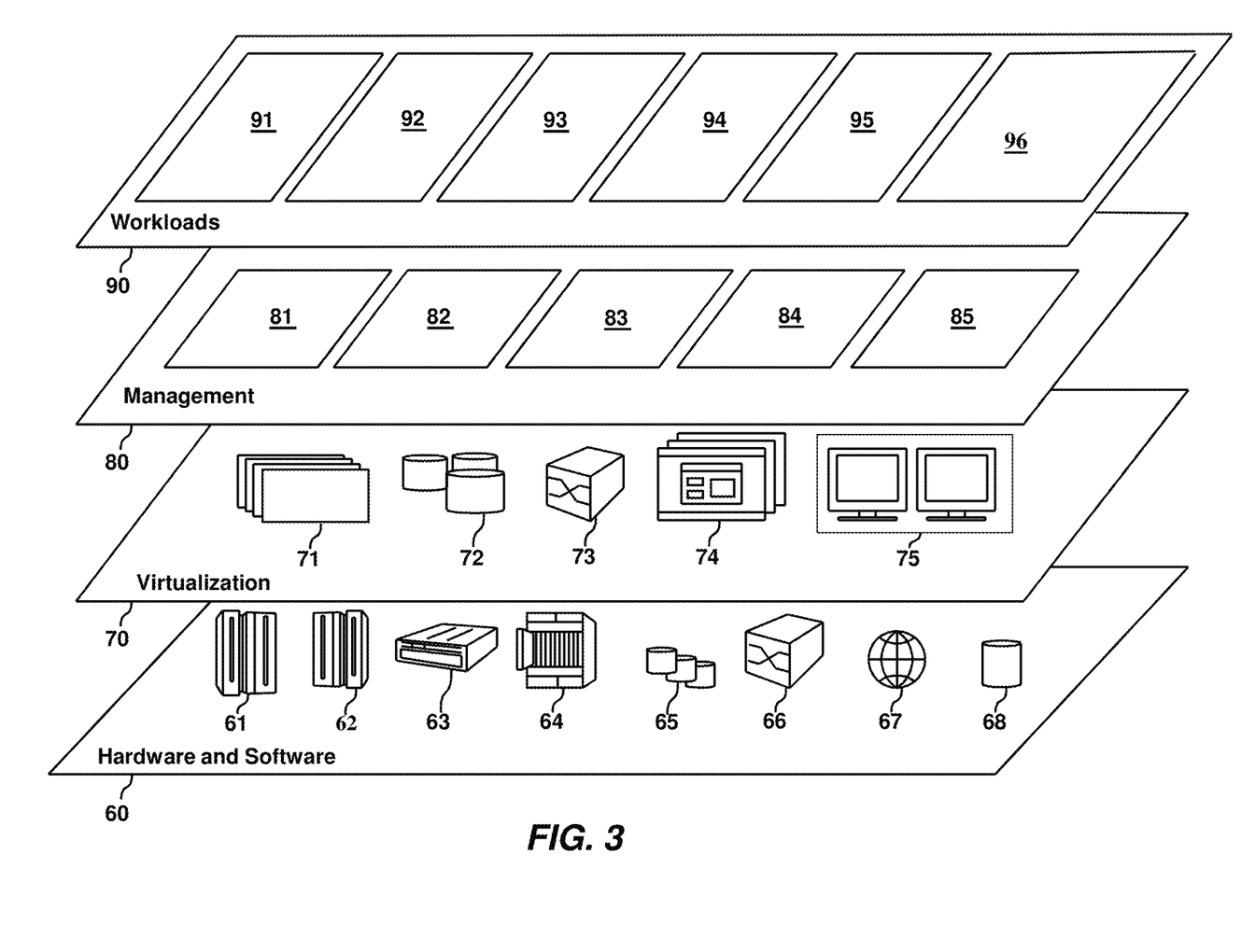
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and defect enhancement 96.

There are various types of defects of a display panel of an electronic device, like "white point", "black point", "white group", "black group", "scratches" in different colors, etc. Those types of defects can be defined based on practical needs, such as color, size, shape, etc. For purpose of simplicity, detail description of several types of defects are shown in Table 1 below for illustration, which suggests no limitation to the present disclosure. Embodiments of the present disclosure can be applied to more or less defects with the same, similar or totally different definitions.

TABLE 1

|  | White point | Black point | White group | Black group | Blue scratch |
|---|---|---|---|---|---|
| Color | white | black | white | black | blue |
| Shape | round | round | round | round | Strip or curve |
| Size | diameter ≤0.5 mm | diameter ≤0.5 mm | diameter >0.5 mm | diameter >0.5 mm | Lengthen >0.5 mm |

Many conspicuous defects (e.g. a defect with a confidence score above a threshold) can be detected by current machine vision technology. But it is difficult to detect the inconspicuous defect (e.g. very shallow scratch) during the display panel inspection. With increased demand of high quality of electronic product, there is a continuous need to improve the inspection effect so that those inconspicuous defects will not be missed.

Many grayscale panels, commonly having 256 different gray values numbered 0-255, can display a colorful image which is close to a real looking, while some panels of e-book readers may still use black and white screen to display. The color of background of the panel can be adjusted for showing a specific color (e.g. blue, white, black, gray, etc.) for panel inspection.

It was noticed by inventors of present disclosure that some types of defects are more likely to be detected with certain color of background shown on the display panel, while other types of defects may be unlikely to be detected with such color of background shown on the panel. For example, as shown in Table 2 below, it is noted that defects of "white point" and "white group" are unlikely to be detected on a white screen, and a defect of "blue scratch" is unlikely to be detected on a blue screen. "X" shown in Table 2 below means corresponding defect can be detected with corresponding color of background, for example, "black group" can be detected on a white screen. Superimposing images of the display panel shown in different colors may, therefore, enhance a defect to make it easier to be detected. For example, by superimposing the background color in gray and blue, the defect of "white point" can be enhanced. It should be understood that three background colors are illustrated in Table 2 for illustration purpose without suggesting any limitation to the present disclosure. It should also be understood that more or less of background colors can be adopted to superimpose images of a panel, because different colors of background can be sensitive to different types of defects.

TABLE 2

|  | White point | Black point | White group | Black group | Blue scratch |
| --- | --- | --- | --- | --- | --- |
| White background |  | X |  | X | X |
| Gray background | X | X | X | X | X |
| Blue background | X | X | X | X |  |

It was also noted by inventors of the present disclosure that noises could occur when taking picture for a panel (e.g. long exposure noise, luminance noise, color noise, etc.). Such noises are detrimental for defect detection as they will result in false detection of a defect. For example, a dot captured on the panel can be determined as a defect, which is actually a noise. But because the noises involved are independent and incoherent with each other, they can be offset/reduced by superimposing a plurality of images with the same (including similar) or different colors of background in different time slots.

Figure 4:
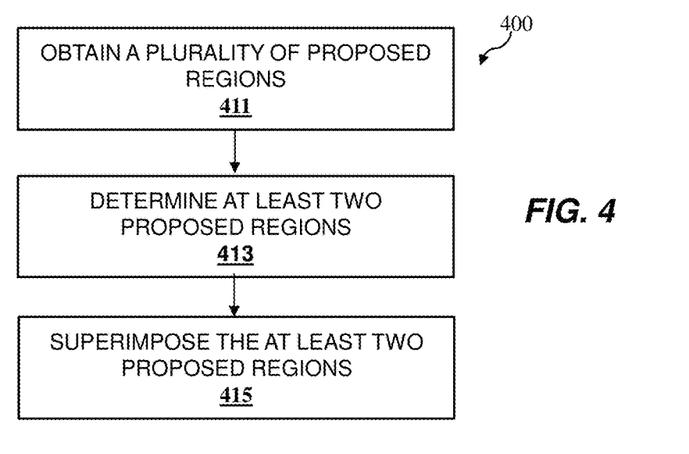
FIG. 4 depicts a flowchart for enhanced defect detection in accordance with an embodiment of the present disclosure.

In order to address one or more problems identified above, embodiments of the present disclosure provide solutions for enhanced defect detection. FIG. 4 depicts a flowchart of a method 400 for enhanced defect detection in accordance with an embodiment of the present disclosure. At step 411, a plurality of proposed regions from a plurality of images taken for a display panel are obtained. Each of the proposed regions includes a suspected defect of the display panel. In order to make the inconspicuous defect easier to be detected, those proposed regions can be collected for superimposing.

Figure 5:
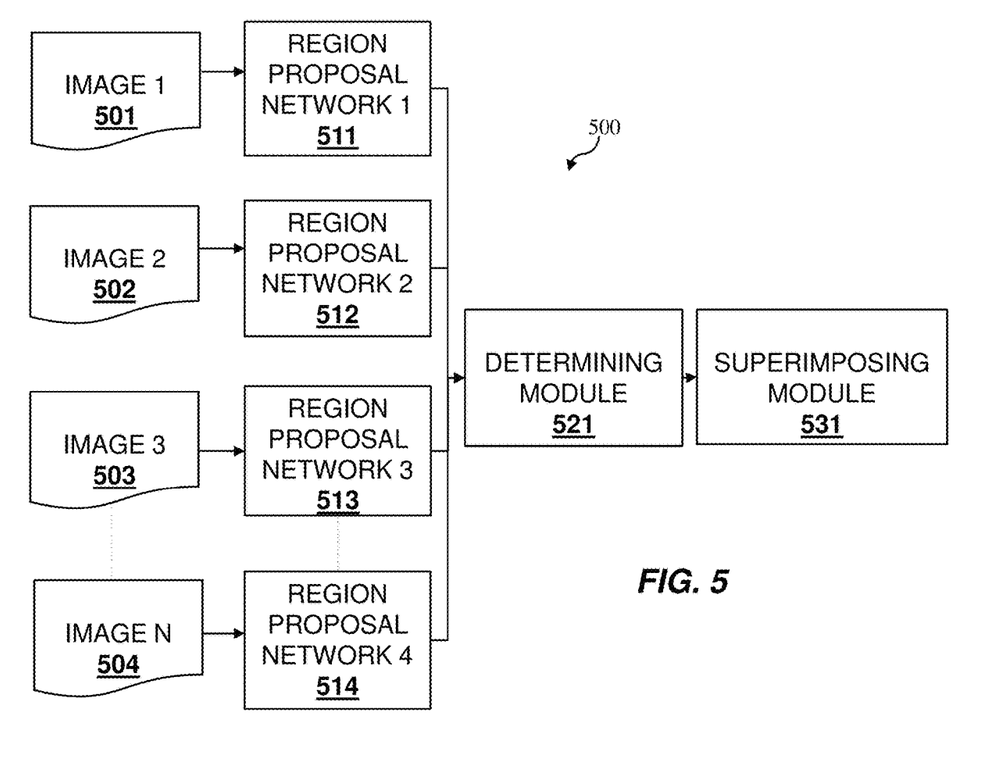
FIG. 5 depicts a diagram for enhanced defect detection in accordance with an embodiment of the present disclosure.

The images can be captured with a camera for shooting right against the screen of the display panel which was setup for showing a specific color of background (e.g. white, gray, blue, and so on). FIG. 5 depicts a diagram of a system (500) for enhanced defect detection in accordance with an embodiment of the present disclosure. A plurality of images, including image 1(501), image 2(502), image 3(503) and image N(504) are shown. Those images can be taken for the whole or part screen of the display panel. And those images can be taken under the same (including similar) or different colors of background shown on the display panel.

Each captured images can be input into a region proposal network (as shown in blocks 511, 512, 513 and 514 of FIG. 5) respectively for obtaining one or more proposed regions. A proposed region could be a subset of the image captured for the display panel which includes a suspected defect. The proposed regions can be at any shape, for example, a rectangle with fixed or dynamic size depends on the size of the defect suspected. The region proposal network could be achieved with existing or future machine learning model. Parameters of the region proposal network could be shared among different region proposal networks so that the criteria to determine a proposed region can be consistent. One or more proposed regions including a suspected defect can be outputted by a region proposal network for a specific image.

Back to FIG. 4, at step 413, at least two proposed regions from the plurality of proposed regions that deserve to be superimposed based on a set of conditions can be determined. This can be achieved by the determining module 521 shown in FIG. 5. The determining module 521 can decide which of the plurality of propose regions output by the region proposal networks are qualified for superimposing. In accordance with embodiments of the present disclosure, the set of conditions comprises (1) the at least two proposed regions refer to the same area of the display panel.

Above condition (1) can ensure the at least two proposed regions, which are to be superimposed, refer to the same area of the display panel. In accordance with embodiments of the present disclosure, the at least two proposed regions referring to the same area of the display panel have the similar (including same) coordinate on at least one corresponding point. There could be various ways to decide whether the at least two proposed regions refer to the same area or not: for example, once the coordinates of the upper left corner of the at least two proposed regions are the same, they will be deemed as referring to the same area; for another example, once the coordinates of center points of the at least two proposed regions are the same, they will be deemed as referring to the same area; for yet another example, once the coordinates of four corners (e.g. upper left, upper right, lower right, lower left) of the at least two proposed regions are the same, they will be deemed as referring to the same area. Additionally, the at least two proposed regions referring to the same area of the display panel further have similar (including same) size (for example, same area). It could be understood that the at least two proposed regions referring to the same area can be further tailored to exactly the same shape for superimposing in the future.

Additionally, the set of conditions can further comprise (2) each of the at least two proposed regions has a confidence degree between the first threshold and the second threshold, wherein the confidence degree indicating the probability of existence of the suspected defect. The second threshold is larger than the first threshold. Embodiments of the present disclosure can be used to identify a suspected defect which is inconspicuous (as its confidence score should be lower than the second threshold) but detectable (as its confidence score should be larger than the first threshold). The confidence degree of such inconspicuous defect can be increased (and may become conspicuous) if corresponding proposed regions are superimposed. For a conspicuous defect, which can be easily detected and handled in traditional methods, there could be no need to do enhancement by superimposing the at least two proposed regions for the purpose of saving the cost (e.g. time cost, computation cost, storing cost, etc.). For an undetectable defect, there could be no need to introduce the corresponding proposed region for superimposing as it will dilute the effect of enhancement. In an extreme example, the first threshold can be 0 or a number very close to 0. Generally, the first threshold and the second threshold could be set based on actual business needs.

Back to FIG. 4, at step 415, the at least two proposed regions are superimposed for acquiring an enhanced defect. The step can be performed by superimposing module 531 in FIG. 5. Till now, the method and diagram for defect enhancement in accordance with embodiments of the present disclosure are briefly described. With the at least two proposed regions being superimposed, a defect which is originally inconspicuous can be enhanced to be more detectable.

Following Formula (1) can represent a theoretical relationship between the number of superimposed regions N and signal to noise ratio (SNR) given a plurality of proposed regions being superimposed for the same area of the display panel under the same (including similar) color of background. As noises are introduced inevitably when taking pictures for the display panel, superimposing proposed regions even with the same (including similar) color of background can at least help to reduce the noises which are generated randomly and independently.

$$SNR(n) = 10 lg \frac{\text{Power (signal)}}{\text{Power (noise)}} \quad (1)$$

$$= 10 lg \frac{\text{Power } (\overline{x(n)})}{\text{Power} \left(\frac{\sum_{i=1}^{N} v_i(n)}{N}\right)}$$

$$= 10 lg \frac{\text{Power } (\overline{x(n)})}{\text{Power} \left(\sum_{i=1}^{N} v_i(n)\right)} + 10 lgN$$

Assuming there are totally N proposed regions extracted for the same area of the display panel based on the same color of background taken on different time slots. Character "n" refers to an area, which can be represented by, for example, at least one coordinate of a corresponding point of a proposed region. And SNR(n) refers to SNR of area n. It is understood that SNR will be represented by logarithmic expression of power of signal against power of noise. For each proposed region, it may include signal part (represented by "$x_i(n)$"), and noise part (represented by "$v_i(n)$"), wherein character "i" is an integer from 1 to N. For each of the proposed regions i, since it always refers to the same area n under the same color of background, the corresponding signal parts "$x_i(n)$" can be the same, while noise parts "$v_i(n)$" could be independent and incoherent with each other. "$\overline{x(n)}$" is used to represent the mean of the signal parts of "$x_1(n)$" to "$x_N(n)$", which will be the same as each "$x_i(n)$" with increase of N. "$\Sigma_{i=1}^{N} v_i(n)$" is used to represent the sum of the noise parts for all the proposed regions, which will be kept as a stable value with the increase of N, because all noise are independent and incoherent. From formula (1), it can be inferred that with the increase of N, "SNR(n)" will also increase. Specially, once N doubles, "SNR(n)" will increase 3 db. Therefore, with the increased number of proposed regions, SNR will be increased for the corresponding area.

Following Formula (2) can represent theoretical relationship between the number of superimposed regions N and signal to noise ratio (SNR) given a plurality of proposed regions being superimposed for the same area of the display panel under the different colors of background. As different colors of background are sensitive to different types of defects, superimposing proposed regions with different colors of background can help to enhance a defect to make it more detectable.

$$SNR(n) = 10 lg \frac{\text{Power (signal)}}{\text{Power (noise)}} \quad (2)$$

$$= 10 lg \frac{\text{Power} \left(\frac{\sum_{i=1}^{N} x_i(n)}{N}\right)}{\text{Power} \left(\frac{\sum_{i=1}^{N} v_i(n)}{N}\right)}$$

$$= 10 lg \frac{\text{Power} \left(\sum_{i=1}^{N} x_i(n)\right)}{\text{Power} \left(\sum_{i=1}^{N} v_i(n)\right)}$$

Assuming there are totally N proposed regions extracted for the same area of the display panel based on the different colors of background. For simplicity, similar concepts which have been used to describe Formula (1) will not be repeatedly described here. Different from Formula (1), where each "$x_i(n)$" can be the same, each "$x_i(n)$" in Formula (2) will be different. And with the increase of N, "$\Sigma_{i=1}^{N} x_i(n)$" will be enhanced, while "$\Sigma_{i=1}^{N} v_i(n)$" will be kept as a stable. Therefore with more proposed regions being superimposed, SNR (n) will increase.

Figure 6:
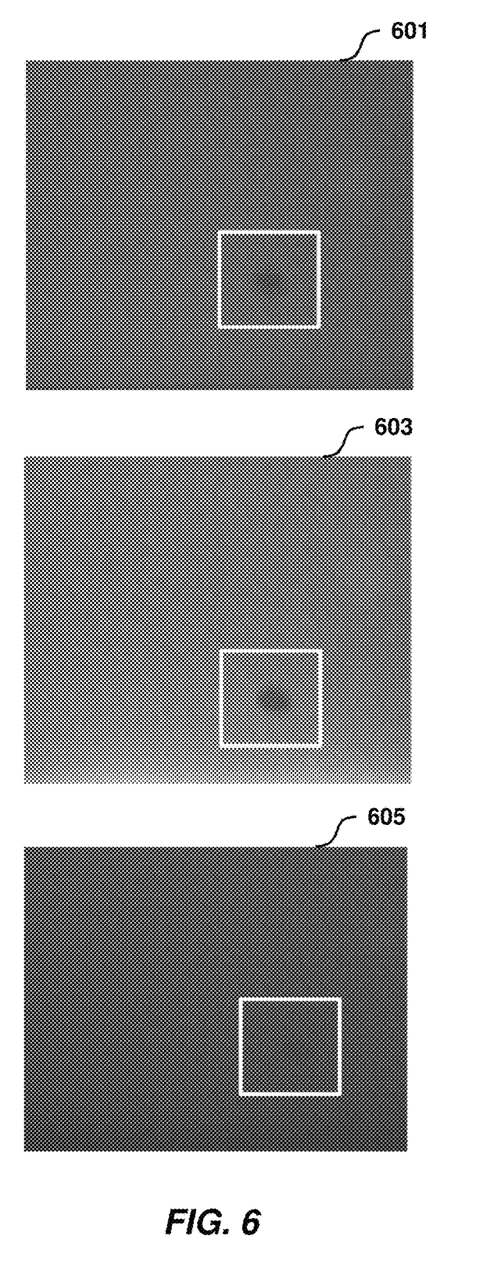
FIG. 6 depicts a defect example "black group" under different colors of background in accordance with an embodiment of the present disclosure.

FIG. 6 depicts a defect example "black group" appearing in three proposed regions referring to the same area of the display panel taken under different colors of background in accordance with an embodiment of the present disclosure. Each of proposed regions 601, 603 and 605 includes a defect "black group" as marked within a white rectangle and meets the set of conditions respectively. The proposed regions are extracted from images of the display panel taken under different colors of background, i.e. proposed region 601 is from a gray background, proposed region 603 is from a white background, proposed region 605 is from a blue background. Please be noted that as the proposed regions 601, 603 and 605 are obtained from actual defect inspection, some defects shown are more obvious, and some defects shown are more vague. For example, the "black group" in the proposed region 603 is much more conspicuous than that in the proposed region 601, and the "black group" in the proposed region 605 can barely be seen from naked-eye, although detectable by a machine or software. In such case, all proposed regions 601, 603 and 605 meeting the set of conditions can be superimposed in step 415 of FIG. 4.

In accordance with embodiments of the present disclosure, the images are taken with different colors of background shown on the display panel. As noted from Table 2 above, different colors of background could be sensitive to different types of defects. More colors of background are used for taking pictures, more likely to detect an inconspicuous defect.

Figure 7:
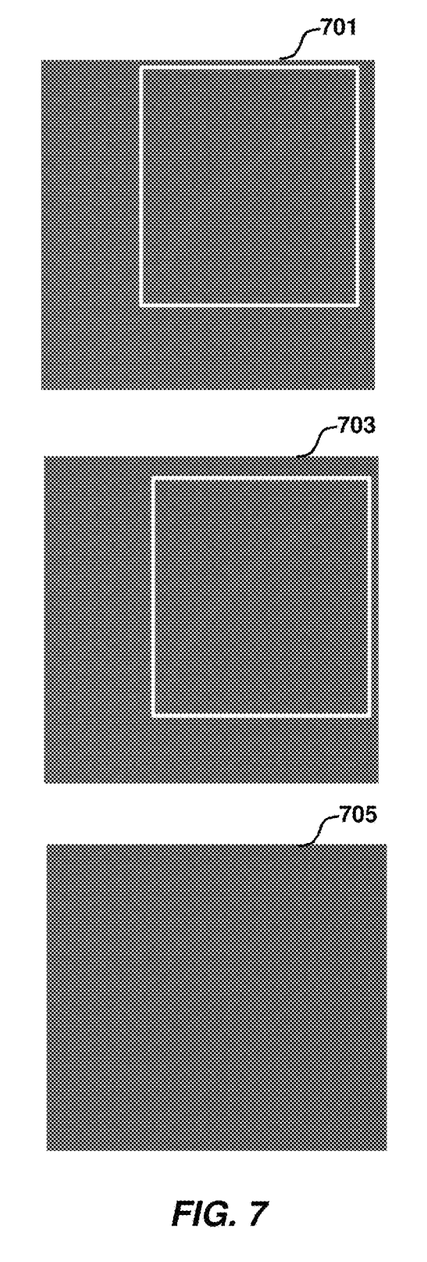
FIG. 7 depicts a defect example "blue scratch" under different colors of background in accordance with an embodiment of the present disclosure.

FIG. 7 depicts a defect example "blue scratch" under different colors of background in accordance with an embodiment of the present disclosure. Similarly, proposed region 601 is from a gray background, proposed region 603 is from a white background, and proposed region 605 is from a blue background. Proposed regions 701, 703 meet the set of conditions and include a defect "blue scratch" marked with a white rectangle respectively, while proposed region 705 does not meet the set of conditions as the "blue scratch" can hardly been visible under a blue background. Therefore only the proposed regions 701 and 703 will be superimposed for defect enhancement, while the proposed region 705 will be omitted.

Figure 8:
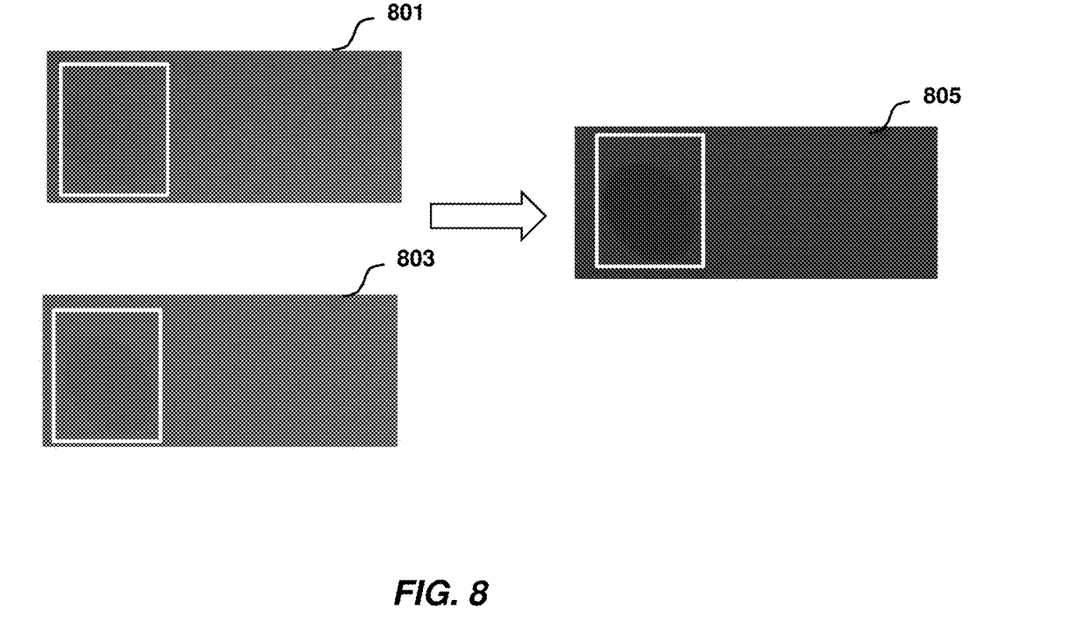
FIG. 8 depicts example effect of enhanced defect "black group" in accordance with an embodiment of the present disclosure.

FIG. 8 depicts example effect of enhanced defect "black group" in accordance with an embodiment of the present disclosure. Proposed regions 801 and 803 both meeting the set of conditions and including a defect "black group" marked in a white rectangle, are superimposed to form region 805. The defect "black group" (still marked in white rectangle) is enhanced to be detected in the superimposed region 805. An inconspicuous defect, therefore, could become clear for detection.

It should be noted that the method/system/computer program product for defect enhancement according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    obtaining, by one or more processing units, a plurality of proposed regions from a plurality of images taken for a display panel;
    determining at least two proposed regions of the plurality of proposed regions from the plurality of images includes an inconspicuous suspected defect on the display panel, wherein an inconspicuous suspected defect is a shallow scratch based on:
        at least two of the proposed regions refer to a same area of the display panel that have matching coordinates, and
        each of the at least two of the proposed regions has a confidence degree between the first threshold and the second threshold, wherein the second threshold is larger than the first threshold; and
    confirming the inconspicuous suspected defect on the display panel as an actual defect by enhancing the suspected defect using at least two proposed regions from the plurality of proposed region, wherein enhancing the inconspicuous suspected defect comprises superimposing images taken at different time slots that depict at least two proposed regions against different background colors.

2. The method of claim 1, wherein the at least two proposed regions referring to the same area of the display panel have similar coordinates on at least one corresponding point.

3. The method of claim 2, wherein the at least two proposed regions referring to the same area of the display panel have similar size.

4. The method of claim 1, wherein the images are taken with different colors of backgrounds shown on the display panel.

5. The method of claim 1, wherein the images are taken with same color of backgrounds shown in different time slots on the display panel.

6. The method of claim 1, further comprising:
    reducing an amount of false detection of a defect caused by noises from the plurality of images taken for a display panel by superimposing images of respective regions with same background colors taken at different times.

7. The method of claim 1, further comprising:
    selectively omitting a region to be superimposed based on a confidence degree associated with the region as being inconspicuous under a certain color background.

8. A computer system comprising:
    one or more processors;
    a memory coupled to at least one of the processors; and
    a set of computer program instructions stored in the memory and executed by at least one of the processors to perform a method comprising:
        obtaining, by one or more processing units, a plurality of proposed regions from a plurality of images taken for a display panel;
    determining at least two proposed regions of the plurality of proposed regions from the plurality of images includes an inconspicuous suspected defect on the display panel, wherein an inconspicuous suspected defect is a shallow scratch based on:
        at least two of the proposed regions refer to a same area of the display panel that have matching coordinates, and
        each of the at least two of the proposed regions has a confidence degree between the first threshold and the second threshold, wherein the second threshold is larger than the first threshold; and
    confirming the inconspicuous suspected defect on the display panel as an actual defect by enhancing the suspected defect using at least two proposed regions from the plurality of proposed region, wherein enhancing the inconspicuous suspected defect comprises superimposing images taken at different time slots that depict at least two proposed regions against different background colors.

9. The computer system of claim 8, wherein the at least two proposed regions referring to the same area of the display panel have similar coordinates on at least one corresponding point.

10. The computer system of claim 9, wherein the at least two proposed regions referring to the same area of the display panel have similar size.

11. The computer system of claim 8, wherein the images are taken with different colors of backgrounds shown on the display panel.

12. The computer system of claim 8, wherein the images are taken with same color of backgrounds shown in different time slots on the display panel.

13. A computer program product comprising:
a computer readable storage medium having program instructions embodied therewith, the program instructions being executable by a computer to cause the computer to perform a method comprising:
  obtaining, by one or more processing units, a plurality of proposed regions from a plurality of images taken for a display panel;
determining at least two proposed regions of the plurality of proposed regions from the plurality of images includes an inconspicuous suspected defect on the display panel, wherein an inconspicuous suspected defect is a shallow scratch based on:
  at least two of the proposed regions refer to a same area of the display panel that have matching coordinates, and
  each of the at least two of the proposed regions has a confidence degree between the first threshold and the second threshold, wherein the second threshold is larger than the first threshold; and
  confirming the inconspicuous suspected defect on the display panel as an actual defect by enhancing the suspected defect using at least two proposed regions from the plurality of proposed region, wherein enhancing the inconspicuous suspected defect comprises superimposing images taken at different time slots that depict at least two proposed regions against different background colors.

14. The computer program product of claim 13, wherein the at least two proposed regions referring to the same area of the display panel have similar coordinates on at least one corresponding point.

* * * * *